US012772317B2

(12) United States Patent
Wu et al.

(10) Patent No.: US 12,772,317 B2
(45) Date of Patent: Oct. 20, 2026

(54) FAST RADIO LINK FAILURE RECOVERY

(71) Applicant: Apple Inc., Cupertino, CA (US)

(72) Inventors: Zhibin Wu, Los Altos, CA (US); Muthukumaran Dhanapal, San Diego, CA (US); Srirang A. Lovlekar, Fremont, CA (US); Fangli Xu, Beijing (CN); Naveen Kumar R Palle Venkata, San Diego, CA (US); Yuqin Chen, Beijing (CN); Sethuraman Gurumoorthy, San Ramon, CA (US); Haijing Hu, Los Gatos, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1177 days.

(21) Appl. No.: 17/778,771

(22) PCT Filed: Sep. 23, 2021

(86) PCT No.: PCT/CN2021/119764
§ 371 (c)(1),
(2) Date: May 20, 2022

(87) PCT Pub. No.: WO2023/044636
PCT Pub. Date: Mar. 30, 2023

(65) Prior Publication Data

US 2023/0337310 A1 Oct. 19, 2023

(51) Int. Cl.
*H04W 76/19* (2018.01)
*H04W 72/231* (2023.01)

(52) U.S. Cl.
CPC ......... *H04W 76/19* (2018.02); *H04W 72/231* (2023.01)

(58) Field of Classification Search
CPC ............................ H04W 76/19; H04W 72/231
(Continued)

(56) References Cited

U.S. PATENT DOCUMENTS 9,049,698 B2 6/2015 Johansson
2014/0051447 A1* 2/2014 Li .................... H04W 36/0064 455/437
(Continued)

FOREIGN PATENT DOCUMENTS

CN 104272851 A 1/2015
CN 107113895 8/2017
(Continued)

OTHER PUBLICATIONS

Extended European Search Report for EP Application No. 21899317.8; Mar. 16, 2023.
(Continued)

*Primary Examiner* — Chi Tang P Cheng
(74) *Attorney, Agent, or Firm* — Kowert, Hood, Munyon, Rankin & Goetzel, P.C.

(57) ABSTRACT

This disclosure relates to techniques for quickly recovering from radio link failure in a wireless communication system. A wireless device may establish a wireless link with a cell. The wireless device may detect radio link failure for the wireless link. The wireless device may attempt to re-establish the wireless link using a previously provided wireless link configuration. If the cell accepts the attempt re-establish the wireless link using the previously provided wireless link configuration, the wireless link may be re-established in accordance with the previously provided wireless link configuration.

20 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2016/0044518 | A1* | 2/2016 | Centonza ............. | H04B 7/0408 370/328 |
| 2019/0174366 | A1* | 6/2019 | Susitaival ............. | H04W 76/19 |
| 2019/0208411 | A1* | 7/2019 | Shrestha ........... | H04W 74/0833 |
| 2019/0306765 | A1 | 10/2019 | Cirik et al. | |
| 2020/0367309 | A1 | 11/2020 | Yang | |

FOREIGN PATENT DOCUMENTS

| | | | |
|---|---|---|---|
| CN | 111565407 | A | 8/2020 |
| CN | 113286331 | | 8/2021 |
| CN | 113330800 | A | 8/2021 |
| EP | 3010280 | | 4/2016 |
| WO | 2018016895 | | 7/2017 |
| WO | 2020029075 | | 2/2020 |
| WO | 2020114371 | | 6/2020 |
| WO | 2020249081 | | 6/2020 |
| WO | 2021092563 | A1 | 5/2021 |
| WO | 2021172964 | | 9/2021 |

OTHER PUBLICATIONS

Huawei et al. "Correction on RLF handling in DAPS"; 3GPP TSG-RAN WG2 Meeting #112electronic R2-2010295; Nov. 2, 2020.

Office Action for CN 202180007168.3; Aug. 1, 2025.

Office Action for EP 21899317.8; Apr. 2, 2025.

International Search Report and Written Opinion for PCT/CN2021/119764; 9 pages; Apr. 7, 2022.

* cited by examiner

FAST RADIO LINK FAILURE RECOVERY

PRIORITY CLAIM

This application is a national phase entry of PCT application number PCT/CN2021/119764, entitled "Fast Radio Link Failure Recovery," filed Sep. 23, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for quickly recovering from radio link failure in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for quickly recovering from radio link failure in a wireless communication system.

According to the techniques described herein, it may be possible for a wireless device and a cellular base station to recover a previously provided wireless link configuration when re-establishing a wireless link after radio link failure. The previously provided wireless link configuration could include the wireless link configuration in most recent use before the radio link failure, or could include a configured fallback wireless link configuration, among various possibilities. Use of such previously provided wireless link configuration information when re-establishing a wireless link after radio link failure may reduce the setup time and signaling overhead associated with the wireless link re-establishment, potentially freeing network resources and reducing any potential interruption to user data communication caused by the RLF, at least according to some embodiments.

Such fast radio link failure recovery techniques may be used when a wireless device performs radio link failure recovery on the same cell to which the wireless device was attached prior to the radio link failure, or may potentially be used when performing radio link failure recovery on another cell that can retrieve the previously provided wireless link configuration information from the previous serving cell of the wireless device. Techniques are also described herein for using previously provided wireless link configuration information with modifications when performing wireless link re-establishment after radio link failure, for handling security in conjunction with such fast radio link failure recovery, and for a variety of other features and considerations that may be used when performing fast radio link failure recovery according to the techniques described herein.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
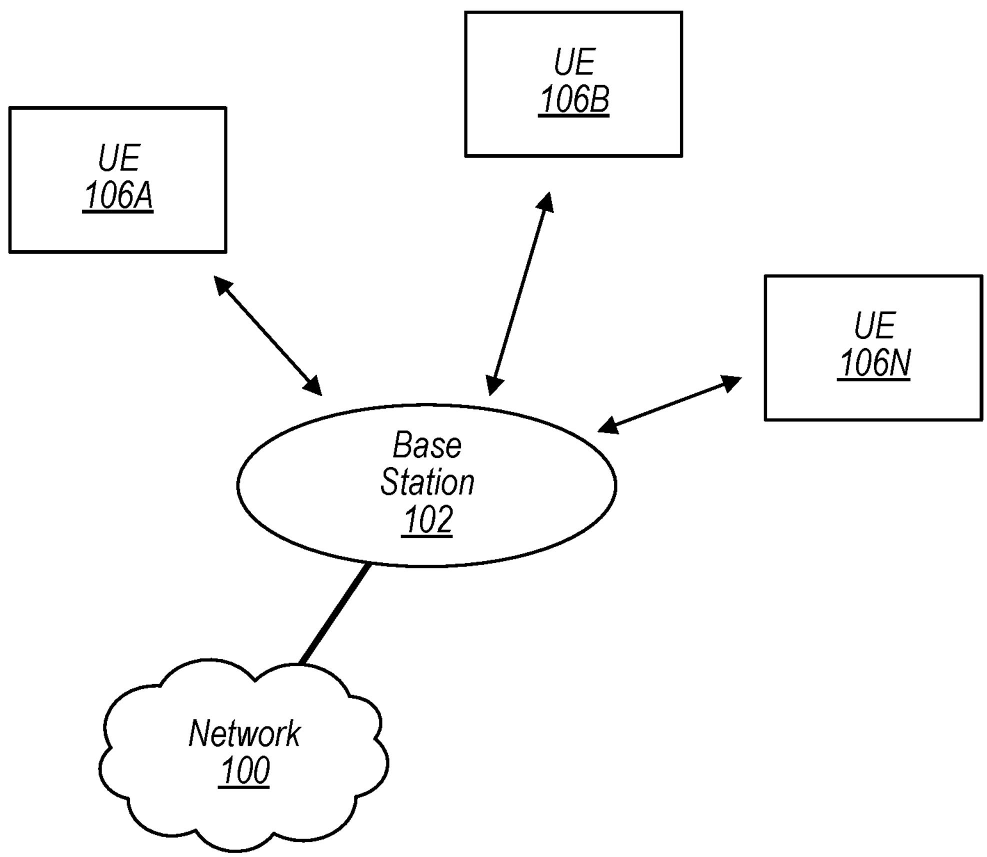
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator Terms The following is a glossary of terms that may appear in the present disclosure.

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modem Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
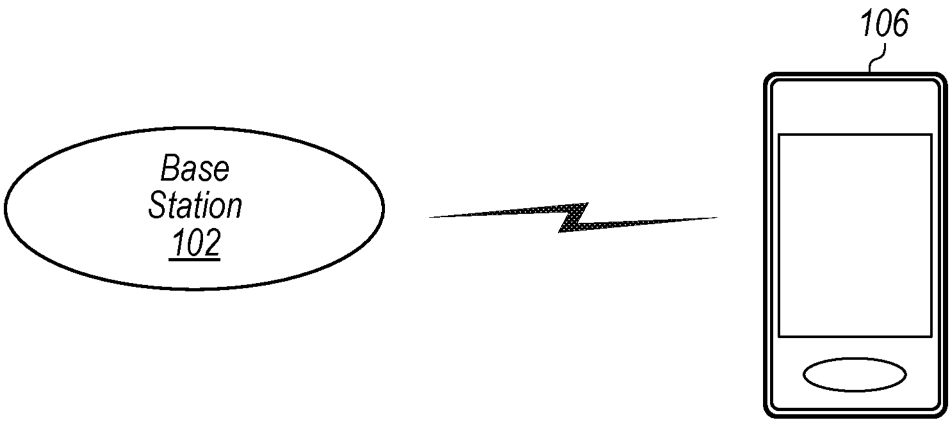
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for quickly recovering from radio link failure in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
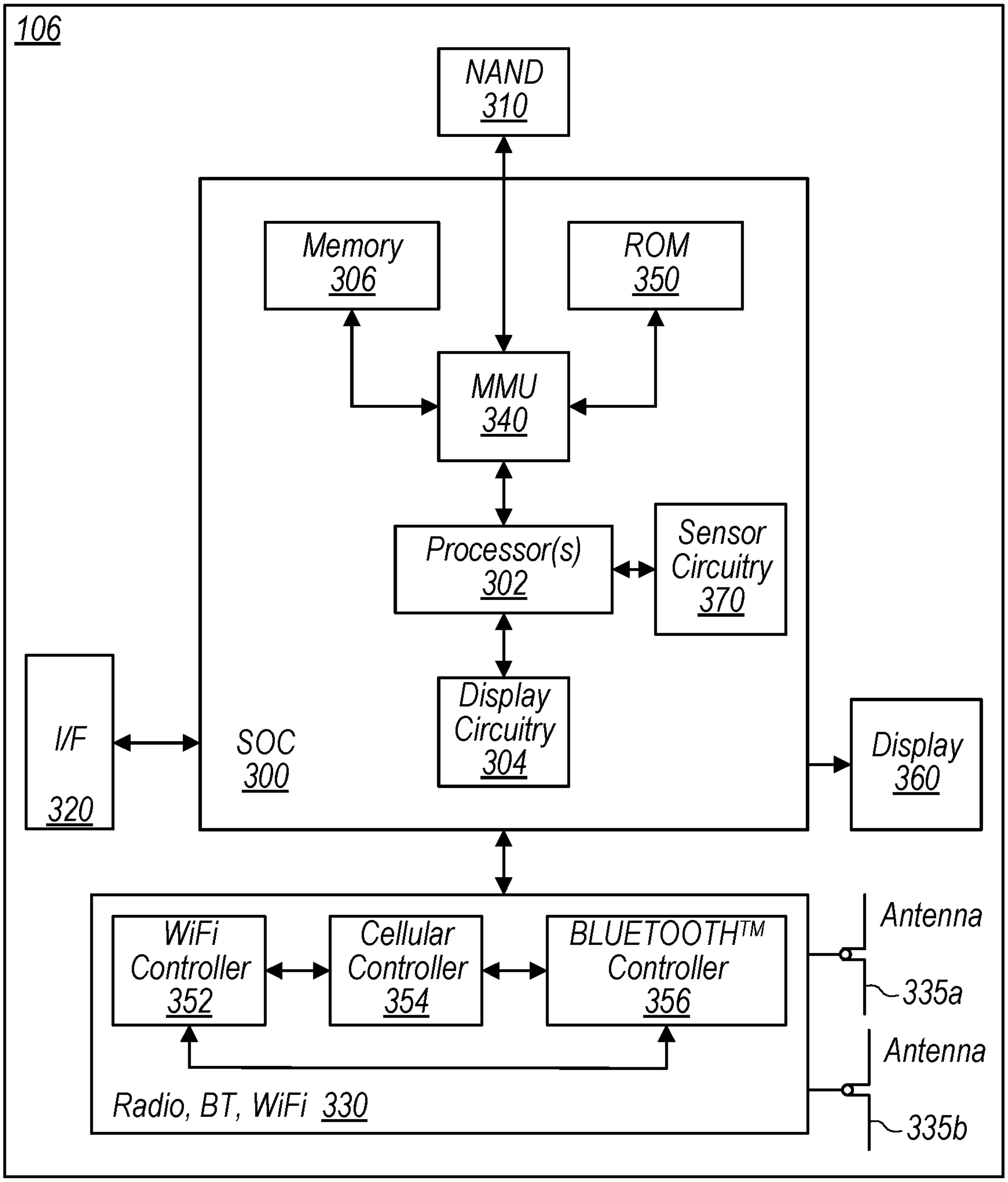
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for quickly recovering from radio link failure in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for quickly recovering from radio link failure in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
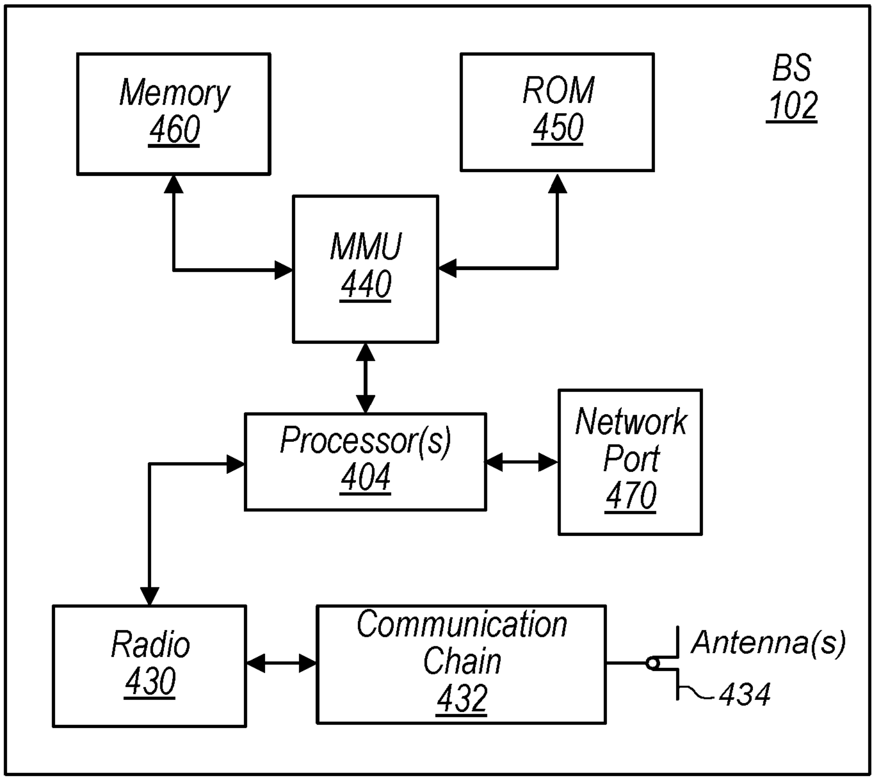
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
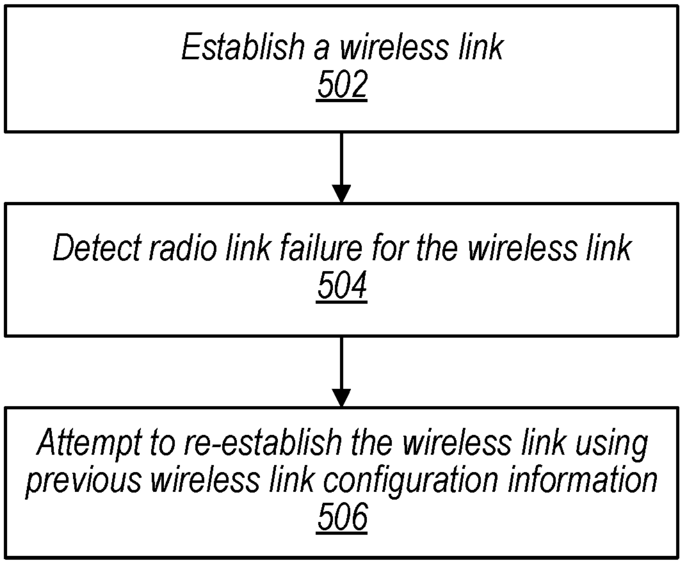
FIG. 5 is a flowchart diagram illustrating aspects of an exemplary possible method for quickly recovering from radio link failure in a wireless communication system, according to some embodiments.

FIG. 5—Fast Radio Link Failure Recovery

Radio link monitoring can be an important part of cellular communication technologies and wireless communication in general. In at least some cellular communication standards, such monitoring can lead to the detection of radio link failure (RLF) in scenarios in which the radio link portion of a cellular link between a wireless device and a cellular network becomes unreliable. When RLF is detected, techniques may be provided for recovering from the RLF, e.g., in order to facilitate the wireless device regaining a reliable radio link with the cellular network.

Since RLF can occur in a variety of scenarios and circumstances, in at least some instances, RLF recovery techniques may include fully reconfiguring the radio resource control (RRC) connection of a wireless device with its serving cellular base station (e.g., that provides the primary cell or PCell for the wireless device), e.g., which may provide significant flexibility in how the wireless device is configured after the RLF, but which may incur significant signaling overhead and setup time to recover the RRC connection. However, there may be some circumstances in which it would be possible for a wireless device to recover directly to a previously provided RRC configuration, which may potentially reduce the overhead and setup time to re-establish the wireless link with the serving cell of the wireless device, which may in turn reduce service interruptions to the wireless device and improve perceived user experience. For example, it may be possible for a wireless device to restore the RRC configuration in use prior to the RLF in some scenarios, such as in case of a temporary (e.g., brief) period in which the wireless device lost its radio link, which could occur when riding an elevator, travelling through a tunnel, or briefly entering a basement with poor cellular reception, among various possibilities.

Accordingly, it may be beneficial to provide techniques for quickly recovering from radio link failure by using previously provided configuration information to re-establish a radio link. To illustrate one such set of possible techniques, FIG. 5 is a flowchart diagram illustrating a method for quickly recovering from radio link failure in a wireless communication system, at least according to some embodiments.

Aspects of the method of FIG. 5 may be implemented by a wireless device and/or a cellular base station, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

According to some embodiments, the cellular base station may indicate to the wireless device that the cellular base station (or the cellular network associated with the cellular base station, or at least a portion thereof, such as a certain group of cellular base stations) supports a fast radio link failure (RLF) recovery feature. The fast RLF recovery feature may allow the wireless device to request that previously provided wireless link configuration information be used to re-establish a wireless link. For example, a previously provided RRC configuration, such as the most recent RRC configuration in use between the wireless device and the cellular base station prior to RLF, could be restored when re-establishing a RRC connection after RLF according to such a feature, at least as one possibility. Indication of support for the fast RLF recovery feature may be provided in broadcast system information (e.g., system information blocks (SIBs)), or as part of RRC configuration information for the wireless device, among various possibilities. In some instances, it may additionally or alternatively be possible for the wireless device to indicate support for such a feature to the cellular base station, for example by including a support flag for the feature in wireless device capability information provided from the wireless device to the cellular base station.

In some instances, the cellular base station may provide default or fallback wireless link configuration that can be used in accordance with such a fast RLF recovery feature to the wireless device. For example, a fallback RRC configuration could be provided when initially establishing a RRC connection, and/or could be configured or reconfigured after the RRC connection is already established, according to various embodiments. Such a fallback wireless link configuration may be applicable just to the current serving cellular base station (e.g., that provides the fallback wireless link configuration), or may be applicable to multiple cells. An indication may be provided to the wireless device of the cell or cells for which the fallback wireless link configuration can be used for fast RLF recovery, at least in some instances.

It may be possible for the cellular base station to provide timer configuration information for a timer associated with the fast RLF recovery feature to the wireless device. For example, such timer configuration information could indicate a timer length for the wireless device to use for a fast RLF recovery availability timer. Such a timer may be initiated by the wireless device when RLF is detected and may control the length of time for which the fast RLF recovery feature is available after RLF. For example, the wireless device may be configured to not attempt to use the fast RLF recovery feature if the fast RLF recovery availability timer is expired.

In 504, the wireless device may detect RLF for the wireless device. Detection of the RLF may include determining that one or more (e.g., specified and/or configured) triggers for RLF have occurred. Such triggers could include a number of consecutive out of sync instances occurring (e.g., as part of radio link monitoring performed by the wireless device) that exceeds a configured threshold, as one possibility. Other mechanisms for detecting RLF and/or types of triggers for RLF are also possible. If configured, the wireless device may initiate the fast RLF recovery availability timer based on detecting RLF for the wireless device.

In 506, the wireless device may attempt to re-establish the wireless link using previously provided wireless link configuration information. The attempt to re-establish the wireless link may include transmitting a request to re-establish the wireless link (such as a RRC re-establishment request) to the cellular base station. The request may include an indication of a preference on the part of the wireless device to use the previously provided wireless link configuration information.

It may be the case that the wireless device attempts to re-establish the wireless link using the previously provided wireless link configuration information based on any of a variety of considerations. For instance, the wireless device may perform cell selection to determine with which cell to attempt to re-establish the wireless link, and may determine whether to try to use the previously provided wireless link configuration information to re-establish the wireless link based at least in part on the cell that is selected for the wireless link re-establishment attempt. For example, as one possibility, if the cell selected is the same cell on which RLF occurred, the wireless device may determine to attempt to re-establish the wireless link using the previously provided wireless link configuration information based at least in part on selecting the same cell on which RLF occurred to attempt to re-establish the wireless link. As another possibility, if fallback wireless link configuration information has been provided for a group of cells, and if a cell in that group of cells is selected, the wireless device may determine to attempt to re-establish the wireless link using the previously provided wireless link configuration information based at least in part on selecting a cell that is in that group of cells to attempt to re-establish the wireless link. Another example consideration may include the condition of the fast RLF recovery availability timer, if such a timer is configured. For example, if such a timer is configured and is unexpired, the wireless device may determine to attempt to re-establish the wireless link using the previously provided wireless link configuration information based at least in part on the timer being unexpired.

The cellular base station may determine whether to re-establish the wireless link using the previously provided wireless link configuration information in response to the request or indication of preference from the wireless device to use the previously configured wireless link configuration information, similarly based on any of a variety of considerations. In some instances, the cellular base station may identify the wireless device based on information provided in the request to re-establish the wireless link, such as a short message authentication code—integrity (shortMAC-1) or inactive radio network temporary identifier (I-RNTI), and may determine whether to proceed to use the previously configured wireless link configuration information to re-establish the wireless link based at least in part on the identification information for the wireless device. The cellular base station may determine whether the previously provided wireless link configuration information is available to the cellular base station. For example, the cellular base station may determine whether configuration information for the wireless device from before the RLF occurred is stored by the cellular base station or has been flushed. As another example, the cellular base station may determine whether configuration information for the wireless device from before the RLF occurred can be retrieved from another cellular base station of the cellular network using I-RNTI information for the wireless device.

If the cellular base station determines not to re-establish the wireless link using previously provided wireless link configuration information, the cellular base station may transmit an indication (e.g., a RRC re-establishment message) to the wireless device to re-establish the wireless link using a new wireless link configuration. In such a case, the cellular base station may also provide new configuration information for the wireless link to the wireless device, for example in a RRC reconfiguration message.

If the cellular base station determines to re-establish the wireless link using previously provided wireless link configuration information, the cellular base station may transmit an indication (e.g., a RRC re-establishment or RRC resume message) to the wireless device to re-establish the wireless link using the previously provided wireless link configuration. In such a case, the cellular base station may not provide configuration information for the wireless link to the wireless device (e.g., there may be no need for a RRC reconfiguration message), which may reduce the setup time and signaling overhead for re-establishing the wireless link in comparison to a scenario in which the wireless link were configured anew.

In some instances, the cellular base station may be able to re-establish the wireless link using the previously provided wireless link configuration information with some modifications. For example, it may be possible for the cellular base station to provide delta configuration to the wireless device. The delta configuration information may indicate changes to the configuration of the wireless link relative to the previously provided wireless link configuration. Such an approach may allow the cellular network more flexibility in configuring the wireless link when performing re-establishment after RLF while still potentially reducing setup time and signaling overhead, at least according to some embodiments.

In some instances, it may be possible for the wireless device and the cellular base station to effectively resume the wireless link after RLF using the previously provided configuration information, including immediately being able to restore the security context for the wireless link. For example, when the cellular base station indicates to re-establish the wireless link using the previously provided wireless link configuration information, it may be possible for the wireless device to perform horizontal key derivation to derive a key for use for encryption and integrity protection using the same next hop chaining count (NCC) from the wireless link configuration from before the RLF. Alternatively, or additionally, it may be possible for the cellular base station to provide security information to the wireless device to support re-establishing security context for the wireless link. For example, when the cellular base station indicates to re-establish the wireless link using the previously provided wireless link configuration information, the NCC for the wireless link may be provided, and the wireless device may use the provided NCC to derive a key (e.g., K*gNB) for use for encryption and integrity protection.

The previously provided wireless link configuration information may include the most recently provided and confirmed configuration information from prior to the RLF, as one possibility. For example, the previously provided wireless link configuration information may be based on the most recent RRC reconfiguration message received from the cellular network by the wireless device for which the wireless device has transmitted a RRC reconfiguration complete message back to the network. In case the cellular base station provided RRC reconfiguration to the wireless device for which the wireless device was unable to provide a RRC reconfiguration complete message and/or the cellular base station did not receive a RRC reconfiguration complete message from the wireless device (e.g., due to the RLF), the RRC configuration for the wireless device prior to the unconfirmed RRC reconfiguration may be used as the previously provided wireless link configuration information, at least in some instances. Alternatively, in some instances, if there is any ambiguity regarding what is the most recent wireless link configuration (e.g., if the cellular network did not receive a RRC reconfiguration complete message in response to its latest RRC configuration message), the cellular base station may determine to provide fresh configuration information to configure the wireless link rather than to use previously provided wireless link configuration information when re-establishing the wireless link.

As another possibility, previously provided wireless link configuration information may include a fallback or default wireless link configuration. For example, as previously noted herein, in some instances it may be possible for a cellular base station to configure a fallback RRC configuration for use for fast RLF recovery prior to RLF occurring, such as when an RRC connection is initially established. In such a scenario, the wireless link may be re-established using the fallback wireless link configuration.

Once the wireless link has been re-established, the wireless device and the cellular base station may resume communicating data and/or signaling (e.g., on one or more signaling radio bearers and/or data radio bearers re-established using the previously provided wireless link configuration information) over the wireless link.

Thus, at least according to some embodiments, the method of FIG. 5 may be used to quickly recover from radio link failure caused by a wireless device temporarily being out of communication range, which may potentially reduce the duration of interruptions to cellular communication caused by such occasions and thereby improve user experience, at least in some instances.

FIGS. 6-10 and Additional Information

FIGS. 6-10 illustrate further aspects that might be used in conjunction with the method of FIG. 5 if desired. It should be noted, however, that the exemplary details illustrated in and described with respect to FIGS. 6-10 are not intended to be limiting to the disclosure as a whole: numerous variations and alternatives to the details provided herein below are possible and should be considered within the scope of the disclosure.

In 3GPP based cellular communication systems, radio link failure (RLF) may occur for a UE that is unable to communicate effectively with its serving cellular base station. While a cellular link with a base station is established and being used (or at least is available for use), the UE may monitor the radio link, for example including determining whether the UE and the cellular base station are in-sync or out-of-sync regularly, and declaring RLF if a configured or specified number of out-of-sync instances occur consecutively, at least according to some embodiments. A UE that experiences RLF may attempt to perform RLF recovery, to try to re-establish a cellular link so that any interruption to cellular service is minimized, at least in some instances.

In many RLF scenarios, the UE may be out-of-communication (OOC) temporarily and may select the previous primary cell (PCell) for resuming its cellular connection. For example, some common circumstances in which a UE might go OOC for a brief period of time then be able to resume the cellular link on the same primary cell could include when a UE enters an elevator, is carried into a basement with poor signal strength, or enters a tunnel (e.g., in a motor vehicle).

Existing connection re-establishment and reconfiguration procedures may be designed to start a new connection, which may include a significant amount of connection setup and configuration signaling, during which time user plane data traffic may be suspended. For example, in some instances, in NR, connection re-establishment and reconfiguration after RLF could take up to 29 ms, while in LTE, such procedures could take up to 28 ms. Other lengths of time are also possible, in various scenarios. In scenarios in which a cellular link can be re-established with the same cell that provided service prior to RLF, it may be possible to utilize context information from the previous connection to reduce setup time for the connection re-establishment. For example, it may be possible to provide techniques whereby a UE and a cellular base station can agree to restore a prior configuration when re-establishing a radio resource control (RRC) connection after RLF rather than exchanging RRC reconfiguration messages to provide an entirely new configuration (e.g., which might still be identical to or overlap significantly with the configuration of the previous connection).

Figure 6:
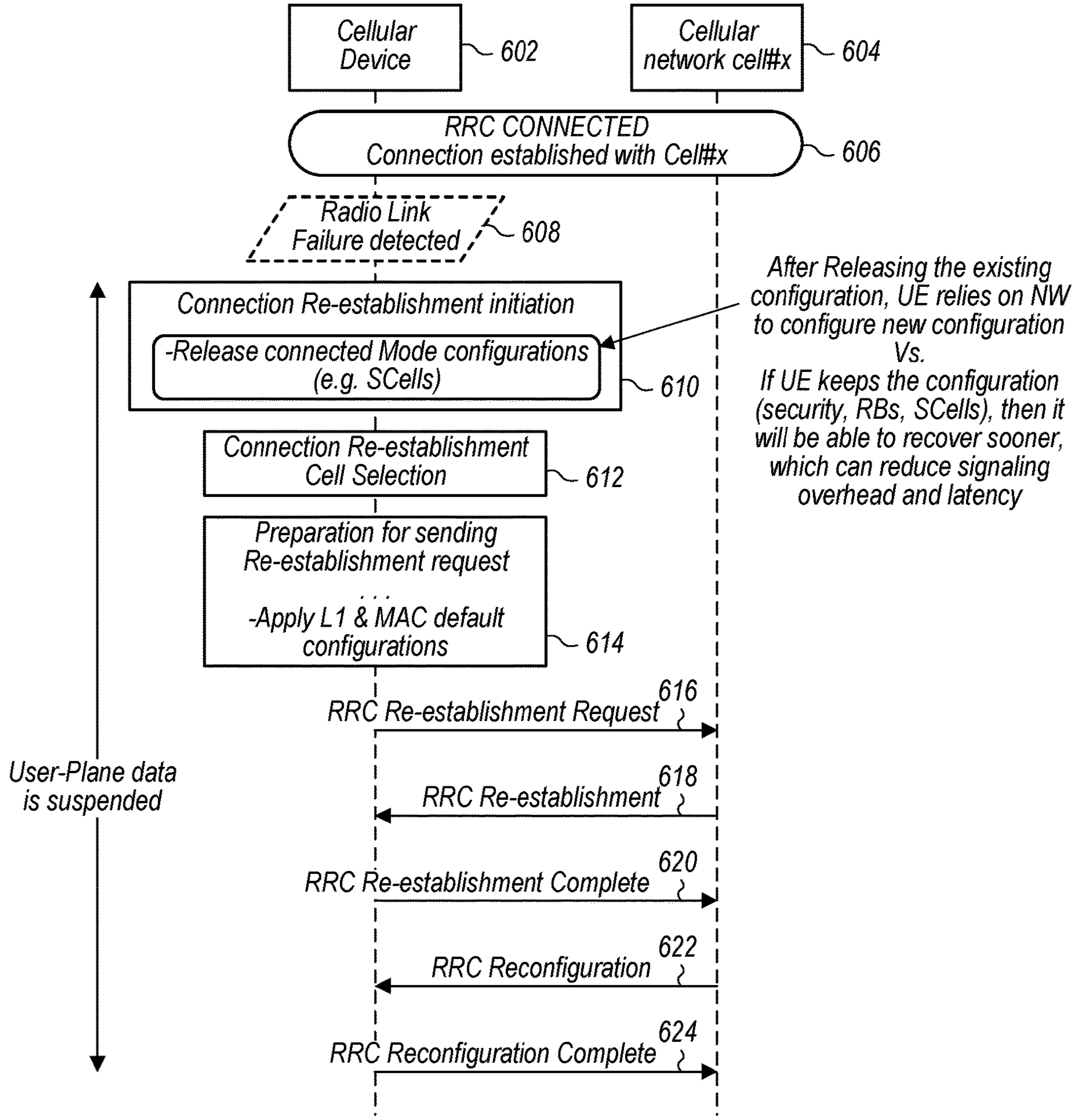
FIG. 6 is a signal flow diagram illustrating aspects of one possible approach to re-establishing a RRC connection after RLF, in which the network provides full configuration information for the new RRC connection, according to some embodiments.

FIG. 6 is a signal flow diagram illustrating aspects of one possible approach to re-establishing a RRC connection after RLF, in which the network provides full configuration information for the new RRC connection, according to some embodiments. As shown, the signal flow may be performed between a cellular device 602 (e.g., a UE) and a cell ("cell #x") 604 of a cellular network. In 606, the cellular device 602 and the cell 604 may have a connection established and may be operating in RRC connected mode. In 608, the cellular device may detect radio link failure. In 610, the cellular device 602 may initiate connection re-establishment, and may release connected mode configuration information (e.g., configuration information for any secondary cells (SCells). In 612, the cellular device 602 may perform cell selection for the connection re-establishment, for example based on signal strength and/or signal quality measurements for one or more cells in the vicinity of the cellular device 602. The cell selection may result in the cellular device 602 selecting the cell 604 on which to perform the connection re-establishment. In 614, the cellular device 602 may prepare for sending a RRC re-establishment request, potentially including applying L1 and media access control (MAC) default configurations (e.g., as configured by the network and/or specified in 3GPP specifications). In 616, the cellular device 602 may provide the RRC re-establishment request to the cell 604. In 618, the cell 604 may provide a RRC re-establishment message to the cellular device 602. In 620, the cellular device 602 may provide a RRC re-establishment complete message to the cell 604. In 622, the cell 604 may provide a RRC reconfiguration message to the cellular device 602. In 624, the cellular device 602 may provide a RRC reconfiguration complete message to the cell 604. User plane data communication, which may have been suspended since the RLF, may resume at this stage.

In the scenario of FIG. 6, after releasing the existing configuration, the UE may be reliant upon the network to provide a new configuration. In contrast, if the UE were to keep the configuration (e.g., including security information, resource block (RB) allocations, SCell configuration information) after RLF, it may be possible to recover the RRC connection sooner (e.g., if recovery is on the same cell for which the configuration is kept), and potentially to reduce signaling overhead and latency.

For example, it may be possible for a UE and a cell to keep the RRC re-establishment procedure but to possibly skip the RRC reconfiguration portion of the RRC connection re-establishment. If the UE selects the same PCell as before the RLF, in the RRC re-establishment request (e.g., using signaling radio bearer 0 (SRB0)), the UE may indicate to the network that it can and prefers to recover from the stored configuration. If the network agrees, the network may retrieve the UE context (if possible), and send the re-establishment message (e.g., using SRB1), which may also be referred to as a message 4, commanding the UE to restore the prior configuration (e.g., including the security context). The UE may restore the prior configuration and restore SRB2 and any data radio bearers (DRBs). The UE may send the RRC re-establishment complete message (which may also be referred to as a message 5) to indicate success. In such a scenario, no further RRC reconfiguration procedure may be needed. Note that if the UE selects a different cell, or if the network does not agree to restore the previous configuration in the message 4, then the UE may release the configuration (e.g., in accordance with 3GPP TS 38.331 5.3.7.2, as one possibility) and follow a procedure that includes network reconfiguration of the RRC connection (e.g., in accordance with 3GPP TS 38.331 5.3.7.5, as one possibility).

Such an approach may be relatively network friendly, as the network may be able to control whether such abbreviated RLF recovery using stored configuration information proceeds or whether RLF recovery using configuration from scratch is performed. When the abbreviated RLF recovery is used, it may be possible to spare the overhead of the RRC reconfiguration message exchange between the UE and the PCell, to save potential RRC processing delay, and/or to potentially reduce the RRC transmission latency (e.g., compared to if the RRC re-establishment request/reconfiguration are not combined/multiplexed in the downlink)

Figure 7:
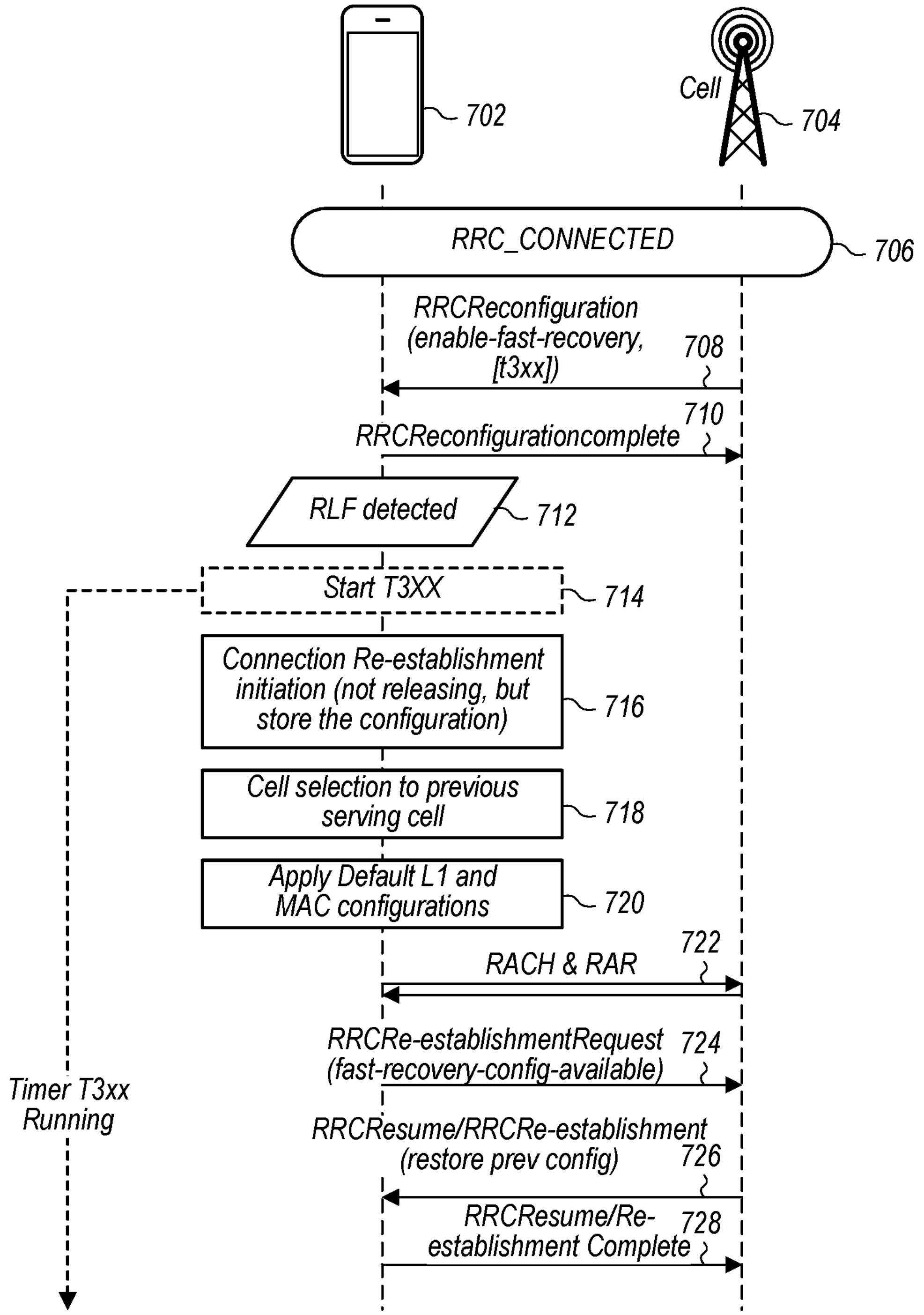
FIG. 7 is a signal flow diagram illustrating possible signaling aspects that may be performed between a UE and a serving cell in preparation for possible rapid RLF recovery before RLF actually occurs, according to some embodiments.

FIG. 7 is a signal flow diagram illustrating further possible details of such an approach, including signaling aspects that may be performed between a UE and a serving cell in preparation for possible rapid RLF recovery before RLF actually occurs, according to some embodiments. As shown, the signal flow may be performed between a UE 702 and a cell 704 of a cellular network. In 706, the UE 702 and the cell 704 may be in RRC connected mode. In 708, the cell 704 may provide a RRC reconfiguration message to the UE 702. The RRC reconfiguration message may include an indication that a fast RLF recovery feature is enabled, and may indicate a timer value ("t3xx") that limits a time window in which a UE can use the fast RLF recovery feature. In 710, the UE 702 may provide a RRC reconfiguration complete message to the cell 704, confirming the reconfiguration. Note that either or both of the indication that the fast RLF recovery feature is enabled and the timer can alternatively or additionally be indicated in system information broadcast by the cell 704 (e.g., in a system information block (SIB)). It may also be possible that such a timer is not used at the UE 702, for example as the network may be able to reject a UE's request for use of the fast RLF recovery feature based on staleness of the stored configuration and/or for any of various other possible reasons.

In 712, RLF may be detected by the UE 702. In 714, the UE 702 may start the configured timer T3XX for fast RLF recovery according to the configured timer value t3xx. In 716, the UE 702 may initiate connection reestablishment, and may store rather than release the configuration for the previous connection. In 718, the UE 702 may perform cell selection for the connection re-establishment, for example based on signal strength and/or signal quality measurements for one or more cells in the vicinity of the UE 702. The cell selection may result in the UE 702 selecting the cell 704 on which to perform the connection re-establishment. In 720, the UE 702 may apply L1 and MAC default configurations. In 722, the UE 702 and the cell 704 may transmit random access channel (RACH) and random access response (RAR) messages, respectively, which may also be referred to as a message 1 and a message 2. In 724, if the timer T3XX has not expired, then the UE can attempt to do a fast RLF recovery. In this case, the UE 702 may provide a RRC re-establishment request to the cell 704, which may indicate that fast RLF recovery configuration information is available at the UE 702. In 726, the cell 704 may provide a RRC resume or RRC re-establishment message to the UE 702, which may indicate to restore the previous (e.g., stored) configuration. In 728, the UE 702 may provide a RRC resume complete or RRC re-establishment complete message to the cell 704, which may complete the RRC connection re-establishment.

Figure 8:
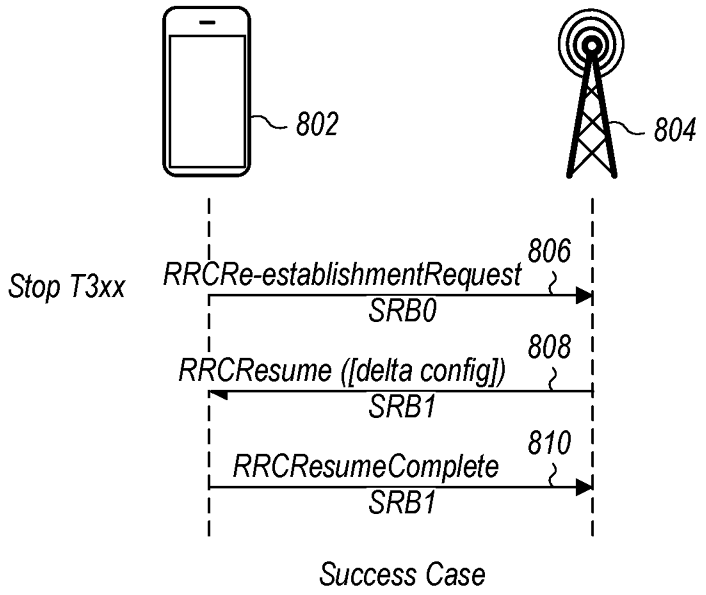
FIGS. 8-10 are signal flow diagrams illustrating further details of possible rapid RLF recovery techniques, including signaling aspects that may be performed between a UE and a serving cell after RLF occurs, according to some embodiments.
Figure 9:
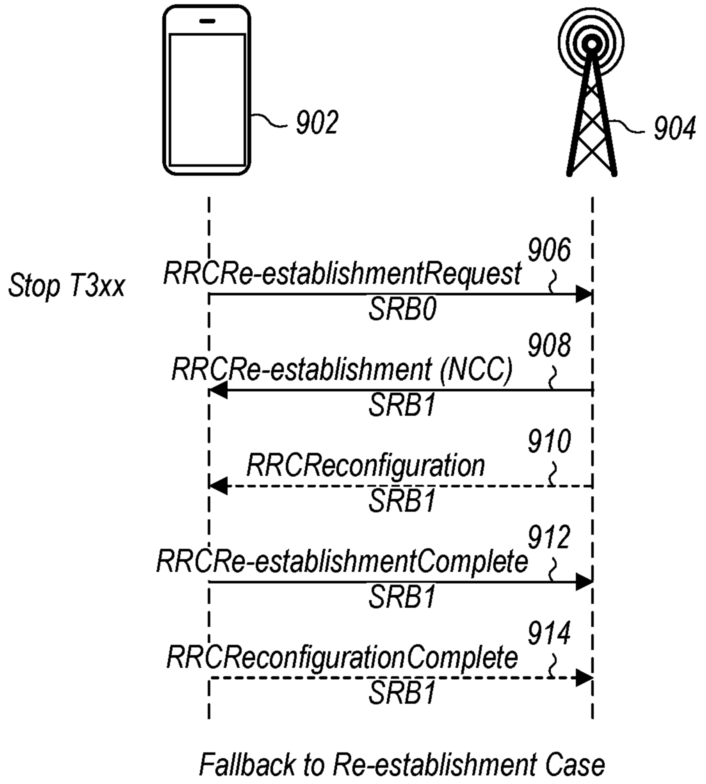

FIGS. 8-9 are signal flow diagrams illustrating further possible details of possible rapid RLF recovery techniques, including signaling aspects that may be performed between a UE and a serving cell after RLF occurs, according to some embodiments.

In particular, FIG. 8 illustrates aspects of a scenario in which a cell 804 indicates that fast RLF recovery for a UE 802 is endorsed by the cell 804. In the illustrated scenario, in 806, the UE 802 may send a RRC re-establishment request to the cell 804, and may stop the timer T3XX that was started when RLF was declared. In 808, the cell 804 may provide a RRC resume message to the UE 802 in response to the RRC re-establishment request. Optionally, delta configuration information (e.g., indicating just changes to the previous configuration that has been agreed upon for use for the connection between the UE 802 and the cell 804) may be provided to the UE 802. It may be the case that no next hop (NH) chaining counter (NCC) is included with the RRC resume message; for example, horizontal key derivation may be used by the UE and the cell 804 to derive the new K*gNB to be used for ciphering. In 810, the UE 802 may send a RRC resume complete message to the cell 804. Note that as an alternative to stopping the timer T3XX when the procedure is initialized (e.g., when sending the RRC re-establishment request), it may be possible that the T3XX timer can be stopped when the UE sends the RRC resume complete message to the cell 804.

FIG. 9 illustrates aspects of a scenario in which a cell 904 indicates that fast RLF recovery for a UE 902 is not endorsed by the cell 904. In the illustrated scenario, in 906, the UE 902 may send a RRC re-establishment request to the cell 904, and may stop the timer T3XX that was started when RLF was declared. In 908, the cell 904 may provide a RRC re-establishment message to the UE 902 in response to the RRC re-establishment request. The RRC re-establishment message may include a NCC. Optionally, in 910, RRC reconfiguration may be embedded in the RRC re-establishment message's container, e.g., to avoid the RRC reconfiguration procedure. In 912, the UE 902 may send a RRC re-establishment complete message to the cell 904. Optionally, in 914, a RRC reconfiguration complete indication may be embedded in the RRC re-establishment complete message's container, e.g., if RRC configuration is embedded in the RRC re-establishment message's container. Similar to the scenario of FIG. 8, as an alternative to stopping the timer T3XX when the procedure is initialized (e.g., when sending the RRC re-establishment request), it may be possible that the T3XX timer can be stopped when the UE sends the RRC re-establishment complete message to the cell 904.

Figure 10:
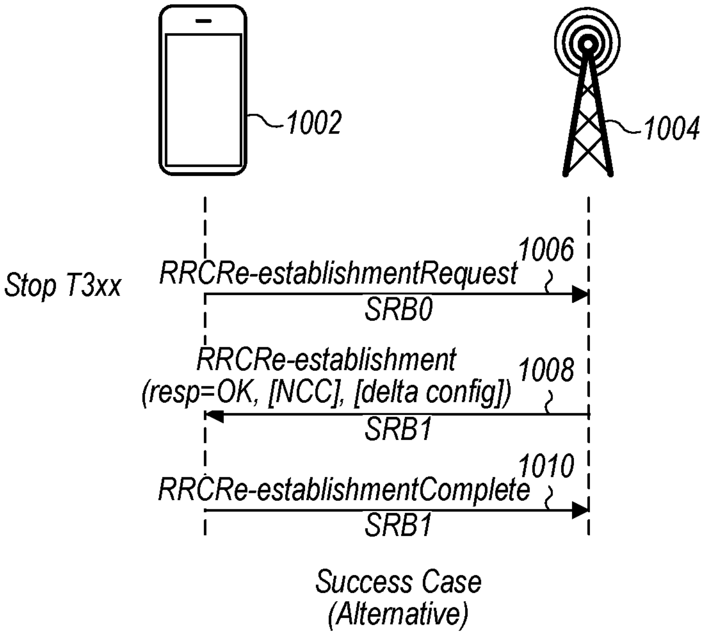

FIG. 10 is a signal flow diagram illustrating aspects of an alternative approach to rapid RLF recovery techniques, including signaling that may be performed between a UE and a serving cell after RLF occurs, according to some embodiments. As shown, the signal flow may be performed between a UE 1002 and a cell 1004 of a cellular network. In the illustrated scenario, in 1006, the UE 1002 may send a RRC re-establishment request to the cell 1004, and may stop the timer T3XX that was started when RLF was declared. In 1008, the cell 1004 may provide a RRC re-establishment message to the UE 1002 in response to the RRC re-establishment request. In the approach illustrated in FIG. 10, the cell 1004 may always send a RRC re-establishment message in response to a RRC re-establishment request, e.g., regardless of whether the cell 1004 endorses use of a previous configuration. Accordingly, the cell 1004 may include a flag to indicate to the UE 1002 whether to re-use the previous configuration. A NCC may be included; if the network accepts horizontal key derivation, then the NCC can remain the same. Optionally, delta configuration information may be included by the cell 1004. Note that the flag indicating whether it is acceptable to re-use the previous configuration may be provided in an unciphered (clear text) manner. If delta configuration information is provided, such information may still be ciphered (e.g., using security information associated with a previous configuration that has been indicated to be acceptable).

Note that for the message 3 for the RRC re-establishment procedure (e.g., the RRC re-establishment request), it may be possible to include a short message authentication code-integrity (shortMAC-I) to help the network identify the UE transmitting the request. If the UE indicates a preference to use a previous configuration, the network may take the request into account after identifying the UE successfully (e.g., based on physical cell identifier (PCI) and cell radio network temporary identifier (C-RNTI).

NR may require that whenever a configuration is applied (given from the network to the UE), it is via a protected message. For the message 4 for the RRC re-establishment procedure for fast RLF recovery, in a scenario in which the network accepts the fast RLF recovery using a previous configuration and a RRC resume message is used as the message 4, the gNB may remain the same, so there may be no packet data convergence protocol (PDCP) re-location. Accordingly, a horizontal key derivation may be performed by the gNB to derive the new key (K*gNB) to protect the RRC resume message (e.g., to provide encryption and integrity protection). For the message 4 for the RRC re-establishment procedure for fast RLF recovery, in a scenario in which the network accepts the fast RLF recovery using a previous configuration and a RRC re-establishment message is used as the message 4, if no configuration is included, it may be possible that a clear text message 4 is used. In a scenario in which the network does not accept the fast RLF recovery using a previous configuration, the gNB may send a RRC re-establishment message as the message 4, and as the message may not be ciphered, it may be the case that no other configuration information is enclosed. The NCC for the UE may be included, and the UE may conduct horizontal or vertical key derivation based on the NCC.

Note also that it may be possible, at least according to some embodiments, to support an inter-gNB case, e.g., in which a UE can perform rapid RLF recovery on a different cell than the cell on which RLF occurred. In such a scenario, security considerations may include the possible use of two-hop forward security. For example, if the horizontal key derivation has already been used earlier, it may be the case that the target gNB cannot use horizontal key derivation again. Accordingly, in such a scenario, it may be the case that the message 4 always includes a new NCC. In some instances, the UE may include a bit-indicator in the message 3 to indicate whether horizontal or vertical key derivation was used in the generation of the prior KgNB.

Another potentially important consideration for rapid RLF recovery techniques that make use of a previous configuration between a UE and a network may include the alignment between the UE and the network regarding the previous configuration that is used for the rapid RLF recovery. For example, at least according to some embodiments, the network may not know when the UE enters RLF, and may accordingly not necessarily know for certain what the previous configuration of the UE is at the time of RLF, such as potentially in a scenario in which the network has sent a RRC reconfiguration message but not received a RRC reconfiguration complete message to confirm the reconfiguration.

As one option for handling such a scenario, the network may determine to not modify the configuration for the UE in accordance with the RRC reconfiguration message since it has not received an RRC reconfiguration complete message from the UE. If the network has to modify its network resources (e.g., due to load balancing and/or other reasons) such that the previous configuration is no longer valid at the network, the network may determine to fail the fast RLF recovery and instead indicate to the UE to perform full RRC re-establishment including RRC reconfiguration.

On the UE side, in case the UE applies the configuration indicated in a RRC reconfiguration message, generates and provides a RRC reconfiguration complete message to L1, but is unable to deliver it due to the RLF, the UE may determine that until the UE has received lower layer acknowledgements that the RRC reconfiguration complete message has been sent before RLF occurs, the preceding (e.g., prior-to-the-last) configuration may be used for fast RLF recovery. As another possibility, the network may be able to enclose a full new configuration in the message 4 (e.g., to eliminate any mis-alignment concerns), in a similar manner as in a RRC resume procedure. However, in such a scenario, signaling overhead may not be significantly reduced, e.g., in comparison to an approach in which such information is provided in the first RRC reconfiguration message after RRC re-establishment. Thus, at least according to some embodiments, an approach may be used in which in case the UE and network are not aligned with respect to the configuration that would be used for the fast RLF recovery, the network rejects the fast RLF recovery and performs a full configuration of the UE. If the network configures a t3xx timer value for fast RLF recovery (e.g, in a RRCReconfiguration message), the network may store a UE's configuration for a period of time at least equal to the length of the t3xx timer period to facilitate restoration of the configuration, at least in some embodiments.

In some embodiments, it may be possible for a network to provide a default or fallback configuration for a UE while a RRC connection is established (e.g., at the original connection establishment), which is for use in case of RLF. In such a scenario, both the network and the UE may have this configuration for the UE stored for possible use later for RLF recovery. Such a default/fallback configuration can be provided at the original connection establishment time, after the security is established, at least as one possibility. For example, it may be provided in a RRC reconfiguration procedure. The network may be able to update the default/fallback configuration (e.g., in a subsequent RRC reconfiguration procedure), although in such a case it may also be possible (though potentially relatively rarely) for the UE and the network to be out-of-sync with respect to the RRC reconfiguration in scenarios in which RLF occurs during the RRC reconfiguration procedure updating the default/fallback configuration. In some instances, the network may provide a I-RNTI for a UE to use to resume a RRC connection after RLF, and a list of cells on which the I-RNTI can be used for fast RLF recovery, so that UE context can potentially be fetched by a cell even if a different cell is selected after RLF than the UE was attached to before the RLF occurred.

In some embodiments, it may be possible for the network to provide the NCC a priori in earlier configurations to prepare for a possible RLF recovery case. This may allow the UE to avoid a horizontal key derivation. When the network identifies the UE in the message 3 based on shortMAC-I, or based on I-RNTI, the cell may use this NCC to generate a key to encrypt the message 4 and restore SRB2 and any configured DRBs for the UE.

While a common scenario in which the rapid RLF recovery techniques described herein may be used may include when a UE recovers to the same gNB (PCell) after RLF as it was attached to prior to the RLF, as previously noted herein, it may also be possible to provide support for such rapid RLF recovery to a different gNB after RLF than the UE was attached to prior to the RLF. As part of such support, a network may configure a group or a list of cells in which the network allows a UE to perform fast RLF recovery. The fast RLF recovery at the target gNB may involve the target gNB, which may receive a message 3 from the UE requesting fast RLF recovery, to check with the source gNB. In case a default/fallback configuration has been provided, the target gNB may fetch and apply the default/fallback configuration that was provided for the UE. The default/fallback configuration can be a generic configuration that is provided on top of the default PHY configuration (e.g., that may be provided in SIB1 and/or via 3GPP RRC/PHY specifications). Thus, in such a scenario, the default/fallback configuration may be valid for a certain group of cells, as long as the network can retrieve the UE context (e.g., including validation of security) in this group of cells (e.g., based on the RRC re-establishment request sent by the UE). As another possibility, if no default/fallback configuration is provided the target gNB may retrieve the prior configuration from the source gNB, and if the network agrees to restore this prior configuration, the target gNB may send an “OK” response in the message 4 responding to the RRC re-establishment request sent by the UE to restore this configuration.

In the following further exemplary embodiments are provided.

One set of embodiments may include a wireless device, comprising: an antenna; a radio operably coupled to the antenna; and a processor operably coupled to the radio; wherein the wireless device is configured to: establish a radio resource control (RRC) connection with a first cell; detect radio link failure for the RRC connection; and transmit a RRC re-establishment request, wherein the RRC re-establishment request indicates a preference to restore a previously configured RRC configuration.

According to some embodiments, the RRC connection with the first cell has a first RRC configuration, wherein the previously configured RRC configuration indicated to be preferred by the wireless device is the first RRC configuration.

According to some embodiments, the wireless device is further configured to: receive RRC configuration information configuring a fallback RRC configuration for use for fast radio link failure recovery, wherein the previously configured RRC configuration indicated to be preferred by the wireless device is the fallback RRC configuration.

According to some embodiments, the RRC re-establishment request is provided to the first cell, wherein the wireless device is further configured to: determine to indicate the preference to restore the previously configured RRC configuration based at least in part on the RRC re-establishment request being provided to the first cell.

According to some embodiments, the wireless device is further configured to: receive an indication from the first cell of a group of cells on which fast radio link failure recovery using a previously configured RRC configuration is allowed, wherein the RRC re-establishment request is provided to a cell in the group of cells on which fast radio link failure recovery using a previously configured RRC configuration is allowed.

According to some embodiments, the wireless device is further configured to: receive a RRC resume message in response to the RRC re-establishment request, wherein the RRC resume message indicates to restore the previously configured RRC configuration; and perform horizontal key derivation to derive a key for use for encryption and integrity protection for the RRC resume message.

According to some embodiments, the wireless device is further configured to: receive a RRC re-establishment message in response to the RRC re-establishment request, wherein the RRC re-establishment message indicates to restore the previously configured RRC configuration, wherein the RRC re-establishment message indicates a next hop chaining count (NCC); and perform horizontal or vertical key derivation to derive a key for use for encryption and integrity protection the RRC connection based at least in part on the NCC indicated in the RRC re-establishment message.

According to some embodiments, the wireless device is further configured to: receive a timer value indicating a time window for fast radio link failure recovery; and start a timer with the timer value based at least in part on detecting radio link failure for the RRC connection, wherein the RRC re-establishment request indicates a preference to restore a previously configured RRC configuration based at least in part on the timer not being expired.

Another set of embodiments may include an apparatus, comprising: a processor configured to cause a wireless device to: establish a wireless link with a cell provided by a cellular base station; detect radio link failure for the wireless link; and transmit a request to re-establish the wireless link with the cell using a previously provided wireless link configuration.

According to some embodiments, the processor is further configured to cause the wireless device to: receive an indication from the cell to re-establish the wireless link using the previously provided wireless link configuration.

According to some embodiments, the processor is further configured to cause the wireless device to: receive security information from the cell for use for re-establishing the wireless link using the previously provided wireless link configuration.

According to some embodiments, the processor is further configured to cause the wireless device to: receive delta configuration information from the cell indicating changes to the wireless link configuration relative to the previously provided wireless link configuration.

According to some embodiments, the processor is further configured to cause the wireless device to: receive an indication from the cell to re-establish the wireless link using new wireless link configuration information, wherein the previously provided wireless link configuration is not used to re-establish the wireless link based on the indication to re-establish the wireless link using new wireless link configuration information.

A further set of embodiments may include a cellular base station, comprising: an antenna; a radio operably coupled to the antenna; and a processor operably coupled to the radio; wherein the cellular base station is configured to: establish a wireless link with a wireless device; and receive a request to re-establish the wireless link from the wireless device, wherein the request to re-establish the wireless link indicates a preference to recover previously configured wireless link configuration information.

According to some embodiments, the cellular base station is further configured to: transmit an indication to the wireless device to re-establish the wireless link using the previously configured wireless link configuration information.

According to some embodiments, the cellular base station is further configured to: transmit security information to the wireless device for use for re-establishing the wireless link using the previously configured wireless link configuration information.

According to some embodiments, the processor is further configured to cause the wireless device to: transmit delta configuration information to the wireless device indicating changes to the configuration for the wireless link relative to the previously configured wireless link configuration information.

According to some embodiments, the cellular base station is further configured to: transmit an indication to the wireless device to re-establish the wireless link using a new wireless link configuration.

According to some embodiments, the cellular base station is further configured to: provide timer configuration information to the wireless device, wherein the timer configuration information indicates a timer length for a fast radio link failure recovery availability timer.

According to some embodiments, the cellular base station is further configured to: identify the wireless device using one or more of a short message authentication code—integrity (shortMAC-I) or an inactive radio network temporary identifier (I-RNTI); and determine whether to recover previous wireless link configuration information for the wireless link to re-establish the wireless link based at least in part on identifying the wireless device using one or more of a shortMAC-I or an I-RNTI.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless device, comprising:

an antenna;

a radio operably coupled to the antenna; and a processor operably coupled to the radio;

wherein the wireless device is configured to:

establish a radio resource control (RRC) connection with a first cell;

receive, from a cellular base station, a timer value indicating a time window for fast radio link failure recovery;

detect radio link failure for the RRC connection;

start a timer with the timer value based at least in part on detecting radio link failure for the RRC connection;

transmit, based at least in part on the timer not being expired, a RRC re-establishment request, wherein the RRC re-establishment request indicates a preference to restore a previously configured RRC configuration; and receive, from the cellular base station, an indication to re-establish the RRC connection using the previously configured RRC configuration.

2. The wireless device of claim 1, wherein the RRC connection with the first cell has a first RRC configuration, wherein the previously configured RRC configuration indicated to be preferred by the wireless device is the first RRC configuration.

3. The wireless device of claim 1, wherein the wireless device is further configured to:

receive RRC configuration information configuring a fallback RRC configuration for use for fast radio link failure recovery, wherein the previously configured RRC configuration indicated to be preferred by the wireless device is the fallback RRC configuration.

4. The wireless device of claim 1, wherein the RRC re-establishment request is transmitted to the first cell, wherein the wireless device is further configured to:

determine to indicate the preference to restore the previously configured RRC configuration based at least in part on the RRC re-establishment request being transmitted to the first cell.

5. The wireless device of claim 1, wherein the wireless device is further configured to:

receive an indication from the first cell of a group of cells on which fast radio link failure recovery using a previously configured RRC configuration is allowed, wherein the RRC re-establishment request is transmitted to a cell in the group of cells on which fast radio link failure recovery using a previously configured RRC configuration is allowed.

6. The wireless device of claim 1, wherein the wireless device is further configured to:

receive a RRC resume message in response to the RRC re-establishment request, wherein the RRC resume message indicates to restore the previously configured RRC configuration; and perform horizontal key derivation to derive a key for use for encryption and integrity protection for the RRC resume message.

7. The wireless device of claim 1, wherein the wireless device is further configured to:

receive a RRC re-establishment message in response to the RRC re-establishment request, wherein the RRC re-establishment message indicates to restore the previously configured RRC configuration, wherein the RRC re-establishment message indicates a next hop chaining count (NCC); and perform horizontal or vertical key derivation to derive a key for use for encryption and integrity protection the RRC connection based at least in part on the NCC indicated in the RRC re-establishment message.

8. An apparatus, comprising:

a processor configured to cause a wireless device to:

establish a wireless link with a cell provided by a cellular base station;

receive, from the cellular base station, a timer value indicating a time window for fast radio link failure recovery;

detect radio link failure for the wireless link;

start a timer with the timer value based at least in part on detecting radio link failure for the wireless link;

transmit based at least in part on the timer not being expired, a request to re-establish the wireless link with the cell using a previously provided wireless link configuration; and receive, from the cellular base station, an indication to re-establish the wireless link using the previously provided wireless link configuration.

9. The apparatus of claim 8, wherein the processor is further configured to cause the wireless device to:

receive security information from the cell for use for re-establishing the wireless link using the previously provided wireless link configuration.

10. The apparatus of claim 8, wherein the processor is further configured to cause the wireless device to:

receive delta configuration information from the cell indicating changes to the wireless link configuration relative to the previously provided wireless link configuration.

11. The apparatus of claim 8, wherein the processor is further configured to cause the wireless device to:

receive an indication from the cell to re-establish the wireless link using new wireless link configuration information, wherein the previously provided wireless link configuration is not used to re-establish the wireless link based on the indication to re-establish the wireless link using new wireless link configuration information.

12. A cellular base station, comprising:

an antenna;

a radio operably coupled to the antenna; and a processor operably coupled to the radio;

wherein the cellular base station is configured to:

establish a wireless link with a wireless device;

provide timer configuration information to the wireless device, wherein the timer configuration information indicates a timer length for a fast radio link failure recovery availability timer;

receive a request to re-establish the wireless link from the wireless device, wherein the request to re-establish the wireless link indicates a preference to recover previously configured wireless link configuration information, wherein the request is transmitted by the wireless device based at least in part on the fast radio link failure recovery availability timer not being expired, and wherein the fast radio link failure recovery availability timer is started with the timer length based at least in part on the wireless device detecting a radio link failure (RLF) for the wireless link; and transmit, to the wireless device, an indication to re-establish the wireless link using the previously configured wireless link configuration information.

13. The cellular base station of claim 12, wherein the cellular base station is further configured to:

transmit security information to the wireless device for use for re-establishing the wireless link using the previously configured wireless link configuration information.

14. The cellular base station of claim 12, wherein the cellular base station is further configured to:

transmit delta configuration information to the wireless device indicating changes to the configuration for the wireless link relative to the previously configured wireless link configuration information.

15. The cellular base station of claim 12, wherein the cellular base station is further configured to:

transmit an indication to the wireless device to re-establish the wireless link using a new wireless link configuration.

16. The cellular base station of claim 12, wherein the cellular base station is further configured to:

identify the wireless device using one or more of a short message authentication code-integrity (shortMAC-I) or an inactive radio network temporary identifier (I-RNTI); and determine whether to recover previous wireless link configuration information for the wireless link to re-establish the wireless link based at least in part on identifying the wireless device using one or more of a shortMAC-I or an I-RNTI.

17. The cellular base station of claim 16, wherein the cellular base station is further configured to:

determine whether to proceed to use the previously configured wireless link configuration information to re-establish the wireless link based at least in part on identification information for the wireless device.

18. The cellular base station of claim 16, wherein the cellular base station is further configured to:

determine whether the previously configured wireless link configuration information is available to the cellular base station.

19. The cellular base station of claim 18, wherein the cellular base station is further configured to:

determine whether configuration information for the wireless device from before the RLF occurred is stored by the cellular base station or has been flushed.

20. The cellular base station of claim 18, wherein the cellular base station is further configured to:

determine whether configuration information for the wireless device from before the RLF occurred can be retrieved from another cellular base station of the cellular network using I-RNTI information for the wireless device.

* * * * *